(12) United States Patent
Kang (10) Patent No.: US 7,718,304 B2
(45) Date of Patent: May 18, 2010

(54) ELECTRODE FOR FUEL CELL, METHOD OF PRODUCING THE SAME, AND FUEL CELL INCLUDING THE ELECTRODE

(75) Inventor: Hyo-rang Kang, Anyang-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 460 days.

(21) Appl. No.: 11/390,442

(22) Filed: Mar. 28, 2006

(65) Prior Publication Data

US 2007/0166600 A1    Jul. 19, 2007

(30) Foreign Application Priority Data

Jan. 13, 2006    (KR) ................. 10-2006-0003935

(51) Int. Cl.
*H01M 4/94* (2006.01)
*H01M 4/90* (2006.01)
*H01M 4/88* (2006.01)
*H01M 4/86* (2006.01)
*H01M 8/10* (2006.01)

(52) U.S. Cl. ................. 429/44; 429/40; 429/30; 429/33; 502/101

(58) Field of Classification Search ............ 429/40, 429/44, 30, 33; 502/101
See application file for complete search history.

(56) References Cited

U.S. PATENT DOCUMENTS 6,416,898 B1 * 7/2002 Ohzu et al. ............... 429/33

2004/0234839 A1 * 11/2004 Wakizoe et al. ............ 429/42

FOREIGN PATENT DOCUMENTS

| JP | 2000-357524 | 12/2000 |
| JP | 2001-93543 | 4/2001 |
| JP | 2003-138084 | 5/2003 |
| JP | 2006-185919 | 7/2006 |

OTHER PUBLICATIONS

Office Action issued May 25, 2007 by the Korean Intellectual Property Office re: Korean Patent Application No. 2006-3935 (2 pp).
Office Action issued in corresponding Chinese Patent Application No. 2006100680195 dated Aug. 8, 2008.
Office Action issued by the State Intellectual Property Office of China in Chinese Patent Application No. 2006100680195 on May 8, 2009.
Japanese Office Action issued on Oct. 27, 2009.

* cited by examiner

*Primary Examiner*—Bruce F Bell
(74) *Attorney, Agent, or Firm*—Stein McEwen, LLP (57) ABSTRACT

An electrode, a method of producing the same, and a fuel cell including the electrode are disclosed. The electrode includes: a support; and a catalyst layer formed on the support, the catalyst layer includes: a support catalyst; and a proton conductor having an amorphous phase greater than about 60% by weight. The proton conductor includes: at least one material from the group of $B_2O_3$, $ZrO_2$, $SiO_2$, $WO_3$, and $MoO_3$; and $P_2O_5$, the proton conductor being 0.5-60 parts by weight where the support catalyst is 100 parts by weight. The proton conductor can be synthesized at a low enough temperature so that it can be applied to the support with catalyst particles to form a catalyst layer. The coated proton conductor is in a solid state so the fuel cell is stable over time and it does not obstruct a fuel gas so that the catalyst can be more efficiently used.

10 Claims, 7 Drawing Sheets

ELECTRODE FOR FUEL CELL, METHOD OF PRODUCING THE SAME, AND FUEL CELL INCLUDING THE ELECTRODE

CROSS-REFERENCE TO RELATED APPLICATIONS

This application claims the benefit of Korean Patent Application No. 2006-3935, filed on Jan. 13, 2006, in the Korean Intellectual Property Office, the entire content of which is incorporated herein by reference.

BACKGROUND OF THE INVENTION

1. Field of the Invention

Aspects of the present invention relate to an electrode for a fuel cell and a method of producing the same, and more particularly, to an electrode for a fuel cell, the electrode including a proton conductor which exhibits better proton conductivity at high temperatures of 100° C. or higher in a non-humidified condition than conventional proton conductors and can be manufactured at low temperature and a method of producing the electrode.

2. Description of the Related Art

Fuel cells can be classified into proton exchange membrane fuel cells (PEMFCs), phosphoric acid fuel cells (PAFCs), molten carbonate fuel cells (MCFCs), and solid oxide fuel cells (SOFCs) according to the type of electrolyte used in the cells. The operation temperature and materials of constitutional elements of fuel cells are changed according to the type of electrolyte.

Proton conductors can be used both in electrolyte membranes and in electrodes.

Electrolyte membranes act as separators preventing a physical contact between anodes and cathodes and as ion conductors transporting hydrogen ions (protons) from anodes to cathodes. Here, proton conductors, distributed in the electrolyte membranes, act as ion conductors.

Proton conductors are generally made of a perfluorosulfonated polymer called Nafion. Such perfluorosulfonated polymer-based proton conductors are excellent in mechanical strength, chemical stability, and ionic conductivity, but cannot be used at temperatures above 80° C. due to loss of water. Therefore, fuel cells using such perfluorosulfonated polymer-based proton conductors lack high-temperature operating capability.

In view of these problems, research into non-humidified polymer electrolytes is actively being carried out, based on mainly polybenzimidazole (PBI)-phosphoric acid ($H_3PO_4$) systems using phosphoric acid as a proton conductor.

However, the phosphoric acid used in the PBI-phosphoric acid systems is a fluid liquid, and thus, is not uniformly distributed on surfaces of catalyst/carbon particles constituting electrodes but locally soaked in spaces between the catalyst/carbon particles, causing non-uniformity problems.

That is, a redox reaction on electrodes occurs at a surface of a catalyst. At this time, the redox reaction most actively occurs at a portion of a catalyst in the vicinity of a liquid phosphoric acid where mass transfer from a vapor phase and mass transfer to a liquid phase smoothly occur. However, a portion of the catalyst surrounded by the liquid phosphoric acid where the redox reaction is active in the vicinity of the liquid phosphoric acid but where the mass transfer from the vapor phase inactively occurs is not subjected to the redox reaction. As a result, overall catalyst efficiency is reduced.

In addition, a phosphoric acid present in an electrolyte membrane or an electrode may cause the corrosion of a carbon bipolar plate due to its leakage. Here, the "corrosion" indicates formation of foreign substances through reaction between a leaked phosphoric acid and a functional group of a carbon surface. Such a corrosion reaction can be prevented by heat treating a carbon bipolar plate at 2,800° C. or more to remove the functional groups. In such a case, however, the manufacturing costs increase considerably.

In view of the above-described disadvantages of phosphoric acid, use of metal phosphate, such as tin phosphate ($SnP_2O_7$) or zirconium phosphate ($ZrP_2O_7$) as a proton conductor has been considered.

However, metal phosphate preparation involving high-temperature treatment above 500° C. cannot be performed in-situ with preparation of a platinum-carbon supported catalyst which is fragile at temperatures above 400° C.

Figure 2A:
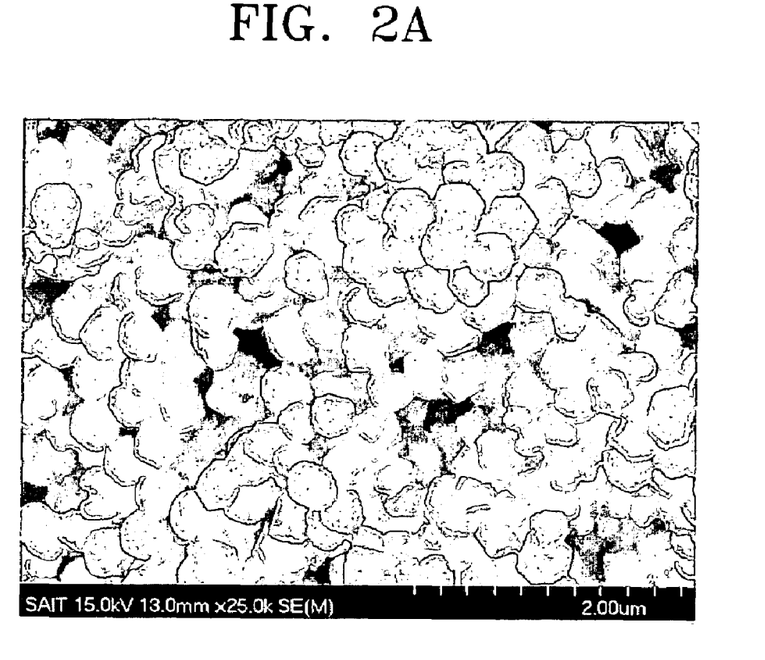
FIGS. 2A and 2B are SEM images of proton conductors made of tin phosphate ($SnP_2O_7$)
Figure 2B:
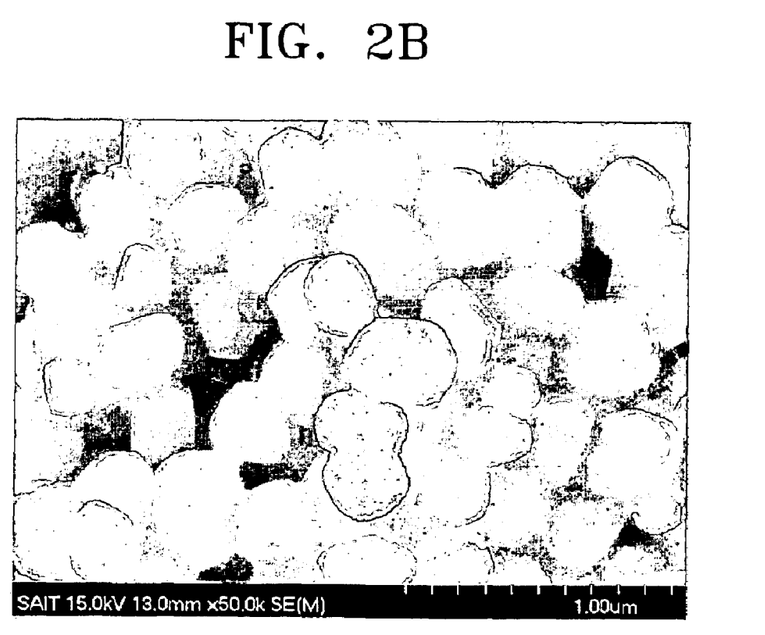
Figure 3:
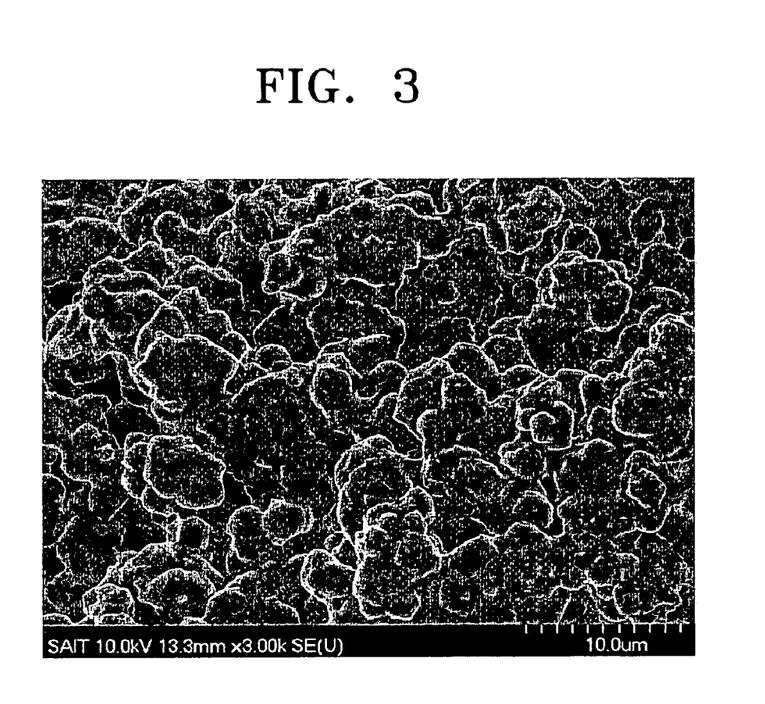
FIG. 3 is a SEM image of a proton conductor made using 85% phosphoric acid and boric acid.

Proton conductors manufactured according to conventional techniques are shown in FIGS. 2A, 2B, and 3. FIGS. 2A and 2B show proton conductors made of tin phosphate ($SnP_2O_7$) surrounded by phosphoric acid. Referring to FIGS. 2A and 2B, many proton conductor particles are agglomerated due to the use of the phosphoric acid. FIG. 3 shows a proton conductor made using 85% phosphoric acid ($H_3PO_4$) and boric acid. Referring to FIG. 3, $BPO_4$ particles are surrounded by the phosphoric acid and considerably agglomerated. These conventional proton conductors are non-uniformly dispersed in a catalyst layer since they have a tendency to be easily agglomerated, and change from a solid state to a fluid state over time due to their moisture absorptivity, thus gradually blocking pores that are channels for mass transfer.

SUMMARY OF THE INVENTION

Accordingly, aspects of the present invention provide a fuel cell electrode including a proton conductor having excellent sustained ionic conductivity even in a high temperature and non-humidified condition and a method of manufacturing the same.

An aspect of the present invention also provides a fuel cell having a high efficiency including the fuel cell electrode.

According to an aspect of the present invention, there is provided an electrode used to form a fuel cell, the electrode including: a support; and a catalyst layer formed on the support, the catalyst layer including: a support catalyst; and a proton conductor having an amorphous phase of 60% by weight or more, the proton conductor including: at least one material selected from the group consisting of $B_2O_3$, $ZrO_2$, $SiO_2$, $WO_3$, and $MoO_3$; and $P_2O_5$, wherein the of the proton conductor is in the range of 0.5 to 60 parts by weight based on 100 parts by weight of the support catalyst.

According to another aspect of the present invention, there is provided a method of producing an electrode used to form a fuel cell, the method including: mixing a support catalyst, a first solvent, metaphosphoric acid, and a solid acid of boron (B), zirconium (Zr), silicon (Si), tungsten (W), or molybdenum (Mo); thermally treating the mixed result; milling the thermal treatment result to obtain a proton conductor containing powder; and coating a catalyst layer forming composition, which is prepared by mixing the proton conductor containing powder and a first binder and a second solvent, on a support and drying the coated result, thereby forming a catalyst layer.

According to another aspect of the present invention, there is provided a method of producing an electrode used to form a fuel cell, the method including: mixing a support catalyst, a third solvent, metaphosphoric acid, a solid acid of boron (B), zirconium (Zr), silicon (Si), tungsten (W), or molybdenum (Mo), and a second binder to prepare a catalyst layer forming composition; and coating the catalyst layer forming composition on a support and thermally treating the coated composition to form a catalyst layer.

According to another aspect of the present invention, there is provided a fuel cell including the electrode described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In order to improve performance of a fuel cell, a fuel gas should be smoothly provided into a catalyst layer and a proton transfer should occur quickly in the catalyst layer. When a proton conductor is a liquid material, such as a phosphoric acid, the catalyst layer is impregnated with the phosphoric acid. In this case, excellent proton conductivity can be obtained, but when the electrode is flooded with the phosphoric acid, it is difficult to provide the gas into the catalyst layer, thereby decreasing a battery performance. On the other hand, when a proton conductor is a solid material, the fuel gas can be smoothly provided into the catalyst layer but a uniform distribution of the solid proton conductor is difficult to obtain.

Figure 8:
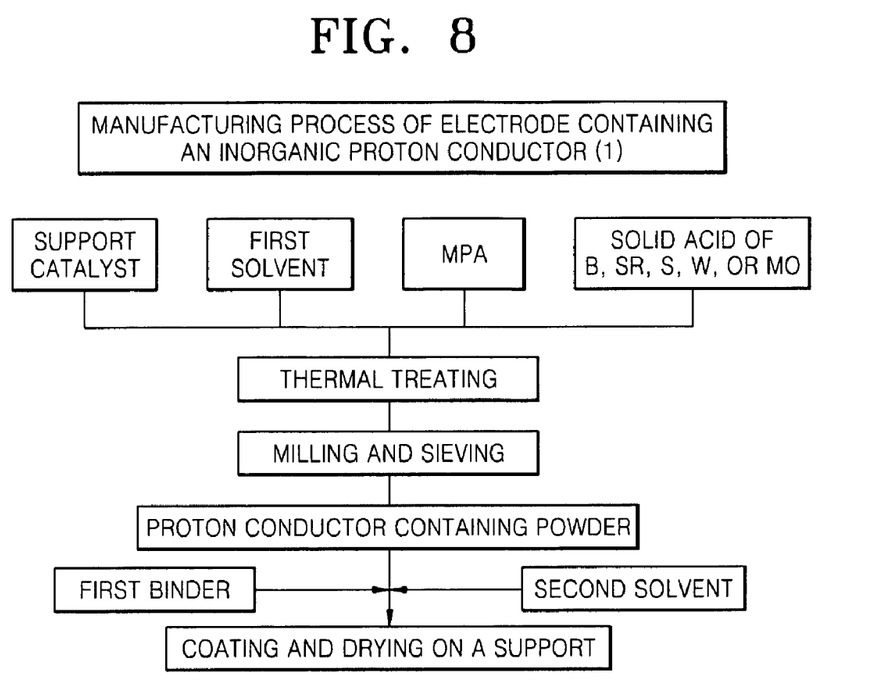
FIGS. 8 and 9 illustrate a method of producing a fuel cell according to an embodiment of the present invention.
Figure 9:
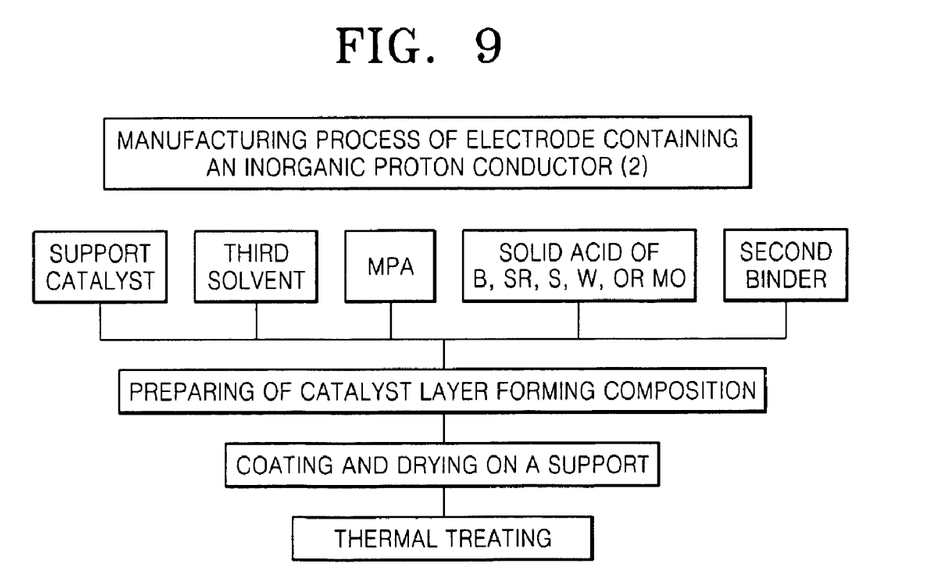

However, according to an embodiment of the present invention, as illustrated in FIGS. 8 and 9, a catalyst layer in which a utilization ratio of a catalyst is increased, a supply channel for gas is secured, and the proton conductors are uniformly distributed, can be obtained using a solid proton conductor.

With reference to FIGS. 8 and 9, a method of producing an electrode for a fuel cell according to an embodiment of the present invention will now be described in detail.

First, a solid acid of boron (B), zirconium (Zr), silicon (Si), tungsten (W), or molybdenum (Mo), a metaphosphoric acid (MPA), and a support catalyst are mixed in a first solvent. The solid acid of B can be a boric acid ($H_3BO_3$), and the solid acid of Si can be a silicic acid. The solid acid of Zr can be a zirconium acid, the solid acid of W can be a tungstic acid, and the solid acid of Mo can be a molybdenic acid.

The solvent is not particularly limited provided that it is a mono- or multi-component dispersing agent capable of dissolving or dispersing the solid acid, the metaphosphoric acid, or the support catalyst. Examples of the solvent include, but are not limited to, water, methanol, ethanol, isopropyl alcohol (IPA), tetrabutylacetate, and n-butylacetate. These solvents can be used alone or in combination. Water, ethanol, and IPA are particularly preferable. The amount of the solvent is not particularly limited. For example, the amount of the solvent can be in the range of 100 to 1000 parts by weight based on 100 parts by weight of the support catalyst. When the amount of the solvent is less than 100 parts by weight based on 100 parts by weight of the support catalyst, the mixing of the solid acid, the metaphosphoric acid, and the support catalyst may be difficult. On the other hand, when the amount of the solvent is greater than 1000 parts by weight, a time required for thermal treatment may increase. In this regard, an appropriate amount of the solvent must be selected.

The metaphosphoric acid is a material having a chemical formula of $(HPO_3)_x$ where x is about 6 and is well dissolved in water and alcohols. In particular, the metaphosphoric acid, when dissolved in water, is gradually converted to $H_3PO_4$.

When the amount of the metaphosphoric acid is too large, solidification of an ion conductor may be poor. On the other hand, when the amount of the solid acid is too large, ionic conductivity may be lowered. In this regard, the weight ratio of the metaphosphoric acid to the solid acid is preferably in the range from 1:0.01 to 1:1, for example, 1:0.2 to 1:0.6.

The amount of the support catalyst is appropriately determined such that the total amount of the solid acid and the metaphosphoric acid is the range of 5-25 parts by weight based on 100 parts by weight of the support catalyst. When the amount of the proton conductor is less than 5 parts by weight based on 100 parts by weight of the support catalyst, the amount of the proton conductor generated is relatively small and the desired ionic conductivity cannot be obtained. On the other hand, when the amount of the proton conductor is greater than 25 parts by weight based on 100 parts by weight of the support catalyst, gas diffusion is affected and the efficiency of the electrode decreases.

The support catalyst used in the embodiment of the present invention is not limited, and is formed of a support and a metal catalyst particle supported by the support. Examples of the metal catalyst particles include, but are not limited to, platinum (Pt), ruthenium (Ru), tin (Sn), palladium (Pd), titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium (Se), tungsten (W), iridium (Ir), osmium (Os), rhodium (Rh), niobium (Nb), tantalum (Ta), lead (Pb), and combinations thereof. For example, the metal catalyst can be a nano-size (3-5 nm) particle of Pt and its alloy. The support can be carbon black, such as vulcan black, ketjen black, or acetylene black.

The support catalyst according to an embodiment of the present invention can be a Pt/C support catalyst or a PtNi/C support catalyst.

The resultant mixture of solid acid, MPA and support catalyst in the first solvent is thermally treated in a heating apparatus containing a heating space, for example in an oven or a furnace. A thermal treatment temperature is in the range from 100 to 400° C., for example 120 to 200° C. When the thermal treatment temperature exceeds 350° C., the catalyst particles may be adversely affected. Furthermore, the thermal treatment at above 400° C. may lower the ionic conductivity of a proton conductor. On the other hand, if the thermal treatment temperature is less than 100° C., manufacturing time may be unacceptably prolonged. A thermal treatment time is not particularly limited but may be selected according to the amount of the mixed components to allow a sufficient time to enable production of an amorphous product from reaction of reactants and solvent evaporation. The thermal treatment time may be in the range from 2 to 36 hours.

The proton conductor prepared as described above is cooled to room temperature, for example, 20° C., milled, and then sieved to collect proton conductor containing powder having a predetermined average particle size.

The proton conductor containing powder is mixed with a first binder and a second solvent to prepare a catalyst layer forming composition.

The second solvent may be an organic solvent that cannot dissolve the proton conductor prepared. The second solvent may be, but is not limited to, acetone, tetrahydrofuran (THF), dimethylsulfoxide (DMSO), N-methylpyrrolidone (NMP), N,N-dimethylacetamide (DMAc), dimethylformamide (DMF), m-cresol, toluene, ethyleneglycol (EG), γ-butyrolactone, or hexafluoroisopropanol (HFIP). These solvents can be used alone or in combination. The amount of the second solvent is in the range of 100 to 500 parts by weight based on 100 parts by weight of the proton conductor containing powder. In particular, when the amount of the second solvent is less than 100 parts by weight, the viscosity of the catalyst slurry is so high that coating is difficult. On the other hand, when the amount of the second solvent is greater than 500 parts by weight, the viscosity of the catalyst slurry is so low that coating is difficult.

The first binder may be polyvinylidenefluoride, polyetherimide, polyacrylonitrile, or the like. The amount of the first binder is in the range of 1-50 parts by weight based on 100 parts by weight of the proton conductor containing powder. In particular, when the amount of the first binder is less than 1 part by weight, the amount of the binder is so small that coating is difficult. On the other hand, when the amount of the first binder is greater than 50 parts by weight, the amount of the binder is so high that the resistance of the electrode increases.

The catalyst layer forming composition is coated on a support and dried to form a catalyst layer.

The support can be a gas diffusion layer, which can be a carbon paper, according to an embodiment of the invention, preferably a water-proofed carbon paper, more preferably a water-proofed carbon paper or carbon cloth coated with a water-proofed carbon black layer.

The water-proofed carbon paper includes about 5 to 50% by weight of a hydrophobic polymer such as polytetrafluoroethylene (PTFE). The hydrophobic polymer may be sintered. The water-proofing treatment for the gas diffusion layer is to ensure channels for both polar liquid reactants and gaseous reactants.

The water-proofed carbon black layer on the water-proofed carbon paper includes a carbon black and a hydrophobic polymer, such as PTFE, as a hydrophobic binder, in an amount of about 20 to 50% by weight. As described above, the water-proofed carbon black layer is attached on a surface of the water-proofed carbon paper. The hydrophobic polymer of the water-proofed carbon black layer is sintered.

The coating of the catalyst layer forming composition may be performed by a bar coating method, a doctor blade method, a screen printing method, a spin coating, a painting method, a spraying method, etc. The coated composition is dried at a temperature of about 60 to 150° C.

With reference to FIG. 9, a method of producing an electrode according to another embodiment of the present invention will now be described in detail.

A catalyst layer forming composition is prepared by mixing a support catalyst; a third solvent; metaphosphoric acid; a solid acid of boron (B), zirconium (Zr), silicon (Si), tungsten (W), or molybdenum (Mo); and a second binder.

The third solvent may be water, isopropyl alcohol, or the like. The amount of the third solvent is in the range of 100-500 parts by weight based on 100 parts by weight of the support catalyst.

The second binder may include at least one water soluble binder selected from styrenebutadienerubber, polytetrafluoroethylene, carboxymethylcellulose (CMC), methylcellulose, polyethyleneoxide, polypropyleneoxide, and the like. The amount of the second binder is in the range of 1 to 50 parts by weight based on 100 parts by weight of the support catalyst.

Amounts of the metaphosphoric acid and the solid acid and Examples of the solid acid are already described above.

The catalyst layer forming composition is coated on a support and thermally treated to form a catalyst layer.

A thermal treatment temperature is in the range from 100 to 400° C., for example 120 to 200° C. When the thermal treatment temperature exceeds 350° C., the catalyst particles may be adversely affected. Furthermore, the thermal treatment at above 400° C. may lower the ionic conductivity of a proton conductor. On the other hand, if the thermal treatment temperature is less than 100° C., a manufacturing time may be unacceptably increased. A thermal treatment time is not particularly limited but may be selected considering the amount of the mixed components to allow a sufficient time to enable production of an amorphous product from reaction of reactants and solvent evaporation. The thermal treatment time may be in the range from 2 to 36 hours.

An electrode used to form a fuel cell prepared according to the methods described above includes a support catalyst, and a proton conductor that includes $P_2O_5$ and at least one compound selected from $B_2O_3$, $ZrO_2$, $SiO_2$, $WO_3$, and $MoO_3$ and has an amorphous phase of about 60% by weight, wherein the amount of the proton conductor is in the range of 5-25 parts by weight based on 100 parts by weight of the support catalyst. When the amount of the proton conductor is less than 5 parts by weight, the amount of the proton conductor is relatively small so that a desired ionic conductivity cannot be obtained. On the other hand, when the amount of the proton conductor is greater than 25 parts by weight, the amount of the proton conductor is so large that an electrical contact between catalyst supports is lowered and the resistance of the electrode increases.

In particular, the amorphous phase of the proton conductor is in the range of 60-90% by weight.

The amount of an amorphous phase of a proton conductor prepared according to an embodiment of the present invention will now be described in detail.

A metaphosphoric acid ($HPO_3$) and boric acid ($H_3BO_3$) are mixed and thermally treated to prepare a proton conductor. At this time, amorphous $P_2O_5$ and $B_2O_3$ are produced according to reaction schemes 1 and 2 below:

<Reaction Scheme 1>

$$2HPO_3 \longrightarrow P_2O_5 + H_2O$$

<Reaction Scheme 2>

$$2H_3BO_3 \longrightarrow B_2O_3 + 3H_2O$$

60% or more of $P_2O_5$ and $B_2O_3$ produced according to an embodiment of the present invention are in an amorphous phase.

Meanwhile, metaphosphoric acid and boric acid are mixed in a weight ratio of 1:0.2 to 1:0.6 to manufacture the proton conductor of an embodiment of the present invention. If orthophosphoric acid is used instead of metaphosphoric acid, chemical reactions represented by reaction schemes 3 and 4 below occur:

<Reaction Scheme 3>

$$H_3PO_4 + H_3BO_3 \longrightarrow BPO_4 + 3H_2O$$

<Reaction Scheme 4>

$$2H_3PO_4 \longrightarrow P_2O_5 + 3H_2O$$

That is, thermal treatment of orthophosphoric acid and boric acid produces crystalline $BPO_4$ through active reaction of excess orthophosphoric acid and boric acid as represented by the reaction scheme 3. Residual orthophosphoric acid produces $P_2O_5$ as represented by the reaction scheme 4. As described above in an embodiment of the present invention, the weight ratio of metaphosphoric acid to boric acid is in the range from 1:0.2 to 1:0.6. If orthophosphoric acid is used instead of metaphosphoric acid in the above weight ratio, an amorphous phase cannot theoretically exceed 60%.

In the proton conductor according to an embodiment of the present invention, the weight ratio of $P_2O_5$ to $B_2O_3$ is in the range from 1:0.12 to 1:0.40, the weight ratio of $P_2O_5$ to the range from 1:0.21 to 1:0.71, the weight ratio of $P_2O_5$ to $SiO_2$ is in the range from 1:0.10 to 1:0.35, the weight ratio of $P_2O_5$ to $WO_3$ is in the range from 1:0.40 to 1:1.33, and the weight ratio of $P_2O_5$ to $MoO_3$ is in the range from 1:0.25 to 1:0.83. When the ratio of $B_2O_3$, $ZrO_2$, $SiO_2$, $WO_3$, or $MoO_3$ is excessively high, the ionic conductivity of the proton conductor may be lowered. On the other hand, when the ratio of $P_2O_5$ is excessively high, solidification of the proton conductor may be poorly performed, thereby lowering formability and causing fluidization.

The ionic conductivity of the proton conductor according to an aspect of the present invention is affected by the crystallinity of the proton conductor. As the crystallinity of the proton conductor decreases, i.e., as the ratio of an amorphous phase increases, ionic conductivity increases.

Figure 1A:
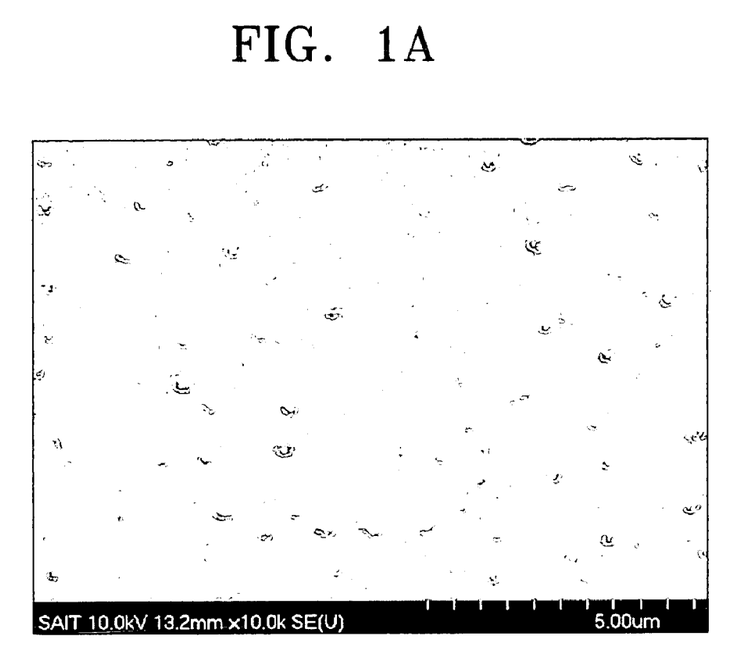
FIGS. 1A and 1B are scanning electron microscopic (SEM) images of proton conductors prepared by thermal treatment at 120° C. and 150° C., respectively, according to an embodiment of the present invention.
Figure 1B:
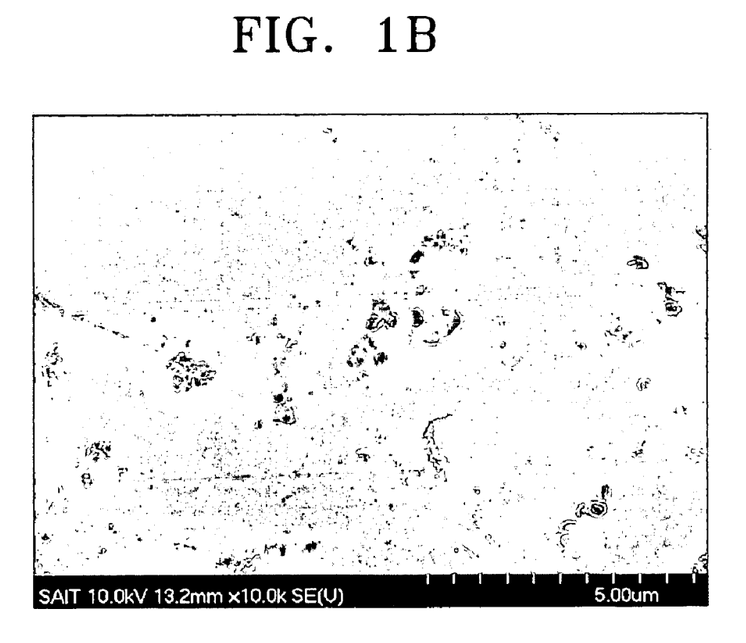

Scanning electron microscopic (SEM) images of proton conductors manufactured according to a method of the present invention are shown in FIGS. 1A and 1B. FIG. 1A shows a proton conductor manufactured by thermal treatment at 120° C. and FIG. 1B shows a proton conductor manufactured by thermal treatment at 150° C.

A proton conductor according to an embodiment of the present invention is composed of mainly an amorphous phase as shown in the SEM images of FIGS. 1A and 1B. In addition, the proton conductor is in a solid phase and thus can be uniformly dispersed in a surface layer of a catalyst.

A fuel cell can be produced using the electrode according to an embodiment of the present invention described above, and a polymer electrolyte membrane such as a polybenzimidazole film. Such a method of producing a fuel cell can be accomplished using any commonly known method disclosed in various references and known to one of skill in the art, and thus will not be described in detail in the present specification.

The present invention will be described in further detail with reference to the following examples. These examples are for illustrative purposes only and are not intended to limit the scope of the present invention.

EXAMPLE 1

0.6 g of metaphosphoric acid, 0.12 g of silicic acid, and 3 g of Pt/C were mixed with 30 g of water. The mixture was thermally treated in a convection oven of 130° C. for 24 hours to prepare a transparent amorphous sample.

The transparent amorphous sample was cooled to room temperature, milled in a mortar, and then sieved to collect a proton conductor containing powder having an average diameter of about 100 nm.

1 g of the proton conductor containing powder was mixed with 0.05 g of polyvinylidenefluoride and 1.5 g of N-methylpyrrolidone to prepare a catalyst layer forming composition slurry.

The catalyst layer forming composition slurry was bar coated on a carbon paper and dried to obtain an electrode (2.8 cm×2.8 cm) for a fuel cell including a catalyst layer formed on a carbon paper. In the electrode, the total amount of $P_2O_5$ and $SiO_2$ acting as a proton conductor was about 25 parts by weight based on 100 parts by weight of a support catalyst, and the mixture ratio of $P_2O_5$ to $SiO_2$ was 1:0.2.

EXAMPLE 2

An electrode for a fuel cell was produced in the same manner as in Example 1, except that 0.24 g of boric acid was used instead of 0.12 g of silicic acid. In the electrode, the total amount of $P_2O_5$ and $B_2O_3$ acting as a proton conductor was about 30 parts by weight based on 100 parts by weight of a support catalyst, and the mixture ratio of $P_2O_5$ to $B_2O_3$ was 1:0.4.

Polybenzimidazole (PBI) films as a polymer electrolyte film were attached to both surfaces of each of the electrodes prepared according to Examples 1 and 2 to produce a unit cell. The performance test on respective unit cells was performed while providing 0.1 L/min of hydrogen and 0.2 L/min of air as a fuel at an operational temperature of 150° C. The results are shown in FIG. 10.

Figure 10:
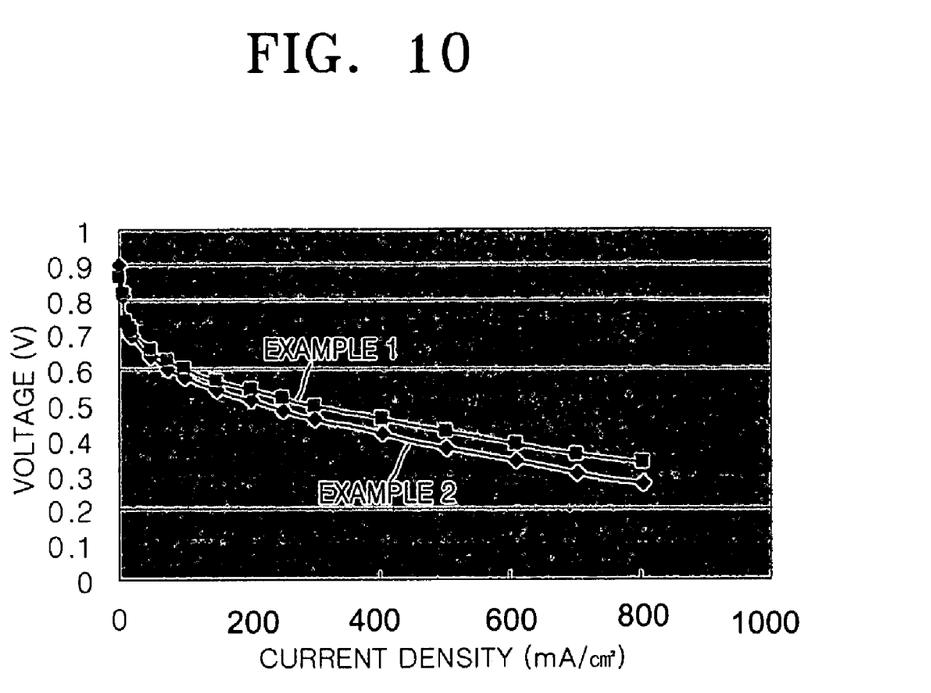
FIG. 10 is a graph of current density with respect to voltage of fuel cells including the electrodes prepared according to Examples 1 and 2, respectively.

Referring to FIG. 10, fuel cells including the electrodes prepared according to Example 1 and Example 2 exhibited high voltage of 0.55 V at a current density of about 200 mA/cm².

EXAMPLE 3

10 g of $(HPO_3)_6$ and 4 g of $H_3BO_3$ were dissolved in 100 g of water. At this time, a Teflon beaker was used since the liquid phosphoric acid was known to react with a glass vessel (PYREX) at high temperature. A clear solution obtained by completely dissolving the phosphoric acid and the boric acid in the water was thermally treated in a convection oven, which had been set to 120° C., for 24 hours. As a result, a transparent amorphous sample was obtained.

The sample was cooled to room temperature and milled in a mortar. 0.3 g of the powders thus obtained was placed in a pellet jig and a pressure of 3,000 psia was applied thereto for one minute to thereby obtain pellets which were 1.3 cm in diameter and 1 mm in thickness. The pellets thus obtained were inserted in the middle of a stainless steel (SUS) electrode with a diameter of 1.5 cm and compressed to measure proton conductivity. As a result, the proton conductivity was found to be 0.0035 S/cm at 120° C.

EXAMPLE 4

A proton conductor was prepared and a proton conductivity of the prepared proton conductor was measured in the same manner as in Example 3, except that the thermal treatment was performed at 150° C. As a result, the proton conductivity was found to be 0.022 S/cm at 120° C.

COMPARATIVE EXAMPLE 10 g of 85 wt % phosphoric acid ($H_3PO_4$) and 4 g of boric acid ($H_3BO_3$) were dissolved in 100 g of water. At this time, a Teflon beaker was used since the liquid phosphoric acid was known to react with a glass vessel (PYREX) at high temperature. A clear solution obtained by completely dissolving the phosphoric acid and the boric acid in the water was thermally treated in a convection oven, which had been set to 120° C., for 24 hours. As a result, a transparent amorphous sample was obtained.

The sample obtained from the thermal treatment was cooled to room temperature and milled in a mortar 0.3 g of the powder thus obtained was placed in a pellet jig and a pressure of 3,000 psia was applied thereto for one minute to thereby obtain pellets which were 1.3 cm in diameter and 1 mm in thickness. The pellets thus obtained were inserted in the middle of an SUS electrode with a diameter of 1.5 cm and compressed to measure proton conductivity. As a result, the proton conductivity was found to be 0.00357 S/cm at 120° C.

Figure 5:
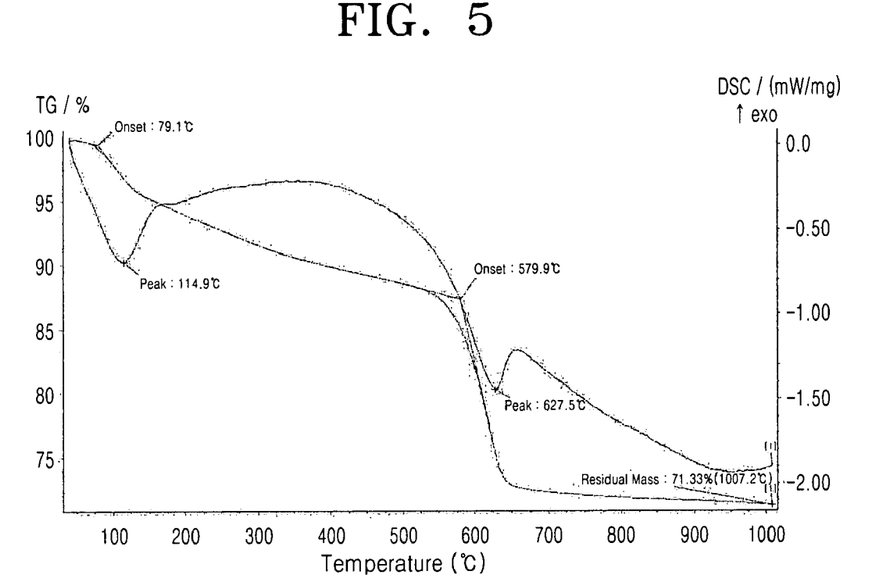
FIG. 5 is a thermal gravimetric analysis (TGA) graph of a proton conductor prepared according to Example 1 of the present invention.
Figure 6:
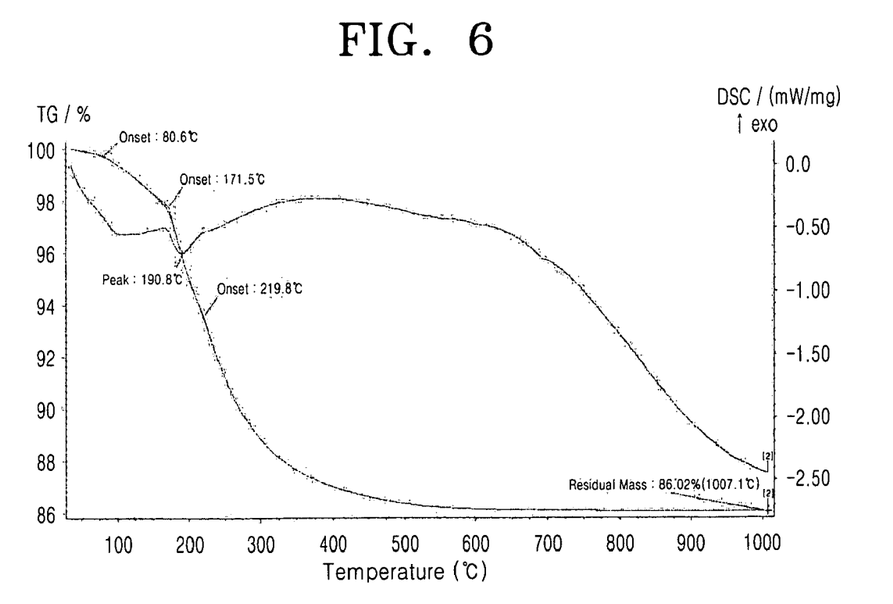
FIG. 6 is a TGA graph of a proton conductor prepared according to Example 2 of the present invention.
Figure 7:
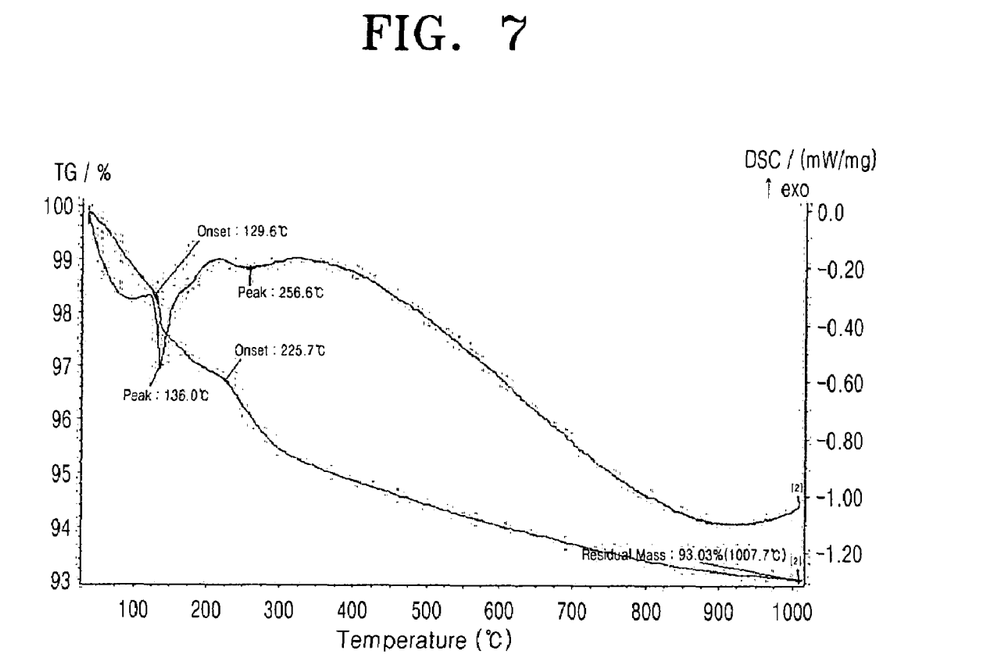
FIG. 7 is a TGA graph of a proton conductor prepared according to Comparative Example.

Thermal gravimetric analysis (TGA) of the proton conductors prepared in Examples 3 and 4 and the Comparative Example was performed, and the results are shown in graphs of FIGS. 5 through 7, respectively. From FIGS. 5 through 7, residual mass values for the proton conductors of Examples 3 and 4 and the Comparative Example were obtained and are presented in Table 1 below.

TABLE 1

|  | Example 3 | Example 4 | Comparative Example |
|---|---|---|---|
| Residual Mass | 71.33% | 86.02% | 93.03% |

The mass of crystalline $BPO_4$ mostly constitutes the residual mass. During the TGA analysis, amorphous $B_2O_3$ and $P_2O_5$ playing an important role in proton conduction in the present invention are converted to crystalline $BPO_4$ at a temperature above 200° C. and then disappear by evaporation at a temperature above 650° C. In this regard, the residual mass at 1,000° C. includes the mass of $BPO_4$ present upon production of a proton conductor and the mass of $BPO_4$ converted from $B_2O_3$ and $P_2O_5$.

As presented in Table 1, the residual mass of $BPO_4$ in the Comparative Example was remarkably higher than that in Examples 3 and 4. This means that the ratio of an amorphous phase to a crystalline phase in Examples 3 and 4 is much higher than that in the Comparative Example.

Figure 4:
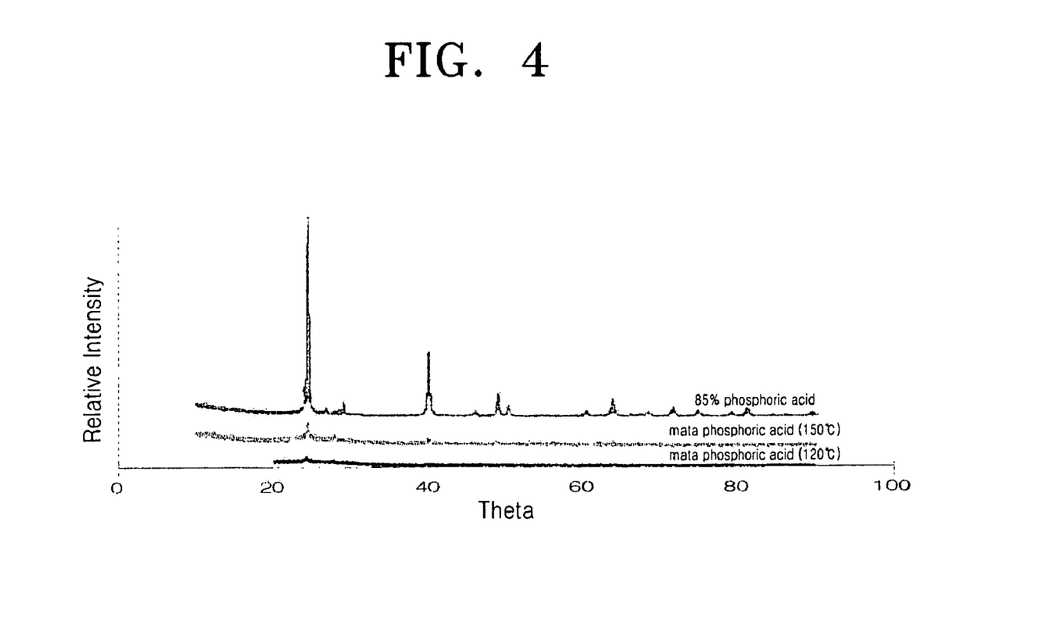
FIG. 4 shows X-ray diffraction (XRD) graphs of the proton conductors of FIGS. 1A, 1B, and 3.

In addition, X-ray diffraction (XRD) analysis for the proton conductors prepared according to Examples 3 and 4 and the Comparative Example was performed and the analysis results are shown in FIG. 4. Referring to FIG. 4, the proton conductor prepared using 85% phosphoric acid and boric acid according to the Comparative Example exhibited high crystallinity, whereas the proton conductors of Examples 3 and 4 exhibited low crystallinity. In particular, the proton conductor of Example 3 prepared by thermal treatment at a lower temperature exhibited higher noncrystallinity than the proton conductor of Example 4 prepared by thermal treatment at a higher temperature. Furthermore, the above proton conductivity measurements show that as noncrystallinity increases, ionic conductivity increases, as described above.

According to a method of producing an electrode according to the present invention, a proton conductor can be synthesized at low temperature so that a proton conductor can be coated together with catalyst particles when a catalyst layer is formed. In addition, the coated proton conductor is in a solid state so that a fuel gas is smoothly provided and thus the catalyst can be more efficiently used. Furthermore, since the proton conductor contained in the catalyst layer exists in a solid state, the proton conductor does not move over time compared to a liquid proton conductor. Therefore, a fuel cell including the electrode exhibits more stability.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode used to form a fuel cell, the electrode comprising:
   a support; and
   a catalyst layer formed on the support, the catalyst layer comprising:
      a support catalyst, and
      a proton conductor having an amorphous phase of 60% by weight or more, the proton conductor comprising:
         at least one material selected from the group consisting of $B_2O_3$, $ZrO_2$, $SiO_2$, $WO_3$, and $MoO_3$; and
         $P_2O_5$,
   wherein an amount of the proton conductor is in a range of 0.5 to 60 parts by weight based on 100 parts by weight of the support catalyst, and
   wherein the weight ratio of $P_2O_5$ to $B_2O_3$ is in a range of 1:0.12 to 1:0.40.

2. An electrode used to form a fuel cell, the electrode comprising:
   a support; and
   a catalyst layer formed on the support, the catalyst layer comprising:
      a support catalyst, and
      a proton conductor having an amorphous phase of 60% by weight or more, the proton conductor comprising:
         at least one material selected from the group consisting of $B_2O_3$, $ZrO_2$, $SiO_2$, $WO_3$, and $MoO_3$; and
         $P_2O_5$,
   wherein an amount of the proton conductor is in a range of 0.5 to 60 parts by weight based on 100 parts by weight of the support catalyst, and
   wherein the weight ratio of $P_2O_5$ to $ZrO_2$ is in a range of 1:0.21 to 1:0.71.

3. An electrode used to form a fuel cell, the electrode comprising:
 a support; and
 a catalyst layer formed on the support, the catalyst layer comprising:
  a support catalyst, and
  a proton conductor having an amorphous phase of 60% by weight or more, the proton conductor comprising:
   at least one material selected from the group consisting of $B_2O_3$, $ZrO_2$, $SiO_2$, $WO_3$, and $MoO_3$; and
   $P_2O_5$,
 wherein an amount of the proton conductor is in a range of 0.5 to 60 parts by weight based on 100 parts by weight of the support catalyst, and
 wherein the weight ratio of $P_2O_5$ to $SiO_2$ is in a range of 1:0.10 to 1:0.35.

4. An electrode used to form a fuel cell, the electrode comprising:
 a support; and
 a catalyst layer formed on the support, the catalyst layer comprising:
  a support catalyst, and
  a proton conductor having an amorphous phase of 60% by weight or more, the proton conductor comprising:
   at least one material selected from the group consisting of $B_2O_3$, $ZrO_2$, $SiO_2$, $WO_3$, and $MoO_3$; and
   $P_2O_5$,
 wherein an amount of the proton conductor is in a range of 0.5 to 60 parts by weight based on 100 parts by weight of the support catalyst, and
 wherein the weight ratio of $P_2O_5$ to $WO_3$ is in a range of 1:0.40 to 1:1.33.

5. An electrode used to form a fuel cell, the electrode comprising:
 a support; and
 a catalyst layer formed on the support, the catalyst layer comprising:
  a support catalyst, and
  a proton conductor having an amorphous phase of 60% by weight or more, the proton conductor comprising:
   at least one material selected from the group consisting of $B_2O_3$, $ZrO_2$, $SiO_2$, $WO_3$, and $MoO_3$; and
   $P_2O_5$,
 wherein an amount of the proton conductor is in a range of 0.5 to 60 parts by weight based on 100 parts by weight of the support catalyst, and
 wherein the weight ratio of $P_2O_5$ to $MoO_3$ is in a range from 1:0.25 to 1:0.83.

6. A fuel cell comprising:
 opposing electrodes, wherein each electrode comprises:
  a support having a solid state proton conductor synthesized at a temperature of less than about 400° C., with a support catalyst in a catalyst layer; and
 an electrolyte membrane, wherein the electrolyte membrane is attached to facing surfaces of the opposing electrodes having the catalyst layer formed thereon,
 wherein the solid state proton conductor has an amorphous phase of 60% by weight or more, the proton conductor comprising:
  at least one material selected from the group consisting of $B_2O_3$, $ZrO_2$, $SiO_2$, $WO_3$, and $MoO_3$; and
  $P_2O_5$,
 wherein the amount of the proton conductor is in the range of 0.5 to 60 parts by weight based on 100 parts by weight of the support catalyst, and
 wherein the weight ratio of $P_2O_5$ to $B_2O_3$ is in a range of 1:0.12 to 1:0.40.

7. A fuel cell comprising:
 opposing electrodes, wherein each electrode comprises:
  a support having a solid state proton conductor synthesized at a temperature of less than about 400° C., with a support catalyst in a catalyst layer; and
 an electrolyte membrane, wherein the electrolyte membrane is attached to facing surfaces of the opposing electrodes having the catalyst layer formed thereon,
 wherein the solid state proton conductor has an amorphous phase of 60% by weight or more, the proton conductor comprising:
  at least one material selected from the group consisting of $B_2O_3$, $ZrO_2$, $SiO_2$, $WO_3$, and $MoO_3$; and
  $P_2O_5$,
 wherein the amount of the proton conductor is in the range of 0.5 to 60 parts by weight based on 100 parts by weight of the support catalyst, and
 wherein the weight ratio of $P_2O_5$ to $ZrO_2$ is in a range of 1:0.21 to 1:0.71.

8. A fuel cell comprising:
 opposing electrodes, wherein each electrode comprises:
  a support having a solid state proton conductor synthesized at a temperature of less than about 400° C., with a support catalyst in a catalyst layer; and
 an electrolyte membrane, wherein the electrolyte membrane is attached to facing surfaces of the opposing electrodes having the catalyst layer formed thereon,
 wherein the solid state proton conductor has an amorphous phase of 60% by weight or more, the proton conductor comprising:
  at least one material selected from the group consisting of $B_2O_3$, $ZrO_2$, $SiO_2$, $WO_3$, and $MoO_3$; and
  $P_2O_5$,
 wherein the amount of the proton conductor is in the range of 0.5 to 60 parts by weight based on 100 parts by weight of the support catalyst, and
 wherein the weight ratio of $P_2O_5$ to $SiO_2$ is in a range of 1:0.10 to 1:0.35.

9. A fuel cell comprising:
 opposing electrodes, wherein each electrode comprises:
  a support having a solid state proton conductor synthesized at a temperature of less than about 400° C., with a support catalyst in a catalyst layer; and
 an electrolyte membrane, wherein the electrolyte membrane is attached to facing surfaces of the opposing electrodes having the catalyst layer formed thereon,
 wherein the solid state proton conductor has an amorphous phase of 60% by weight or more, the proton conductor comprising:
  at least one material selected from the group consisting of $B_2O_3$, $ZrO_2$, $SiO_2$, $WO_3$, and $MoO_3$; and
  $P_2O_5$,
 wherein the amount of the proton conductor is in the range of 0.5 to 60 parts by weight based on 100 parts by weight of the support catalyst, and
 wherein the weight ratio of $P_2O_5$ to $WO_3$ is in a range of 1:0.40 to 1:1.33.

10. A fuel cell comprising:
 opposing electrodes, wherein each electrode comprises:
  a support having a solid state proton conductor synthesized at a temperature of less than about 400° C., with a support catalyst in a catalyst layer; and
 an electrolyte membrane, wherein the electrolyte membrane is attached to facing surfaces of the opposing electrodes having the catalyst layer formed thereon, wherein the solid state proton conductor has an amorphous phase of 60% by weight or more, the proton conductor comprising:

at least one material selected from the group consisting of $B_2O_3$, $ZrO_2$, $SiO_2$, $WO_3$, and $MoO_3$; and $P_2O_5$, wherein the amount of the proton conductor is in the range of 0.5 to 60 parts by weight based on 100 parts by weight of the support catalyst, and wherein the weight ratio of $P_2O_5$ to $MoO_3$ is in a range from 1:0.25 to 1:0.83.

* * * * *